US005747586A

United States Patent [19]

Köhler et al.

[11] Patent Number: 5,747,586
[45] Date of Patent: May 5, 1998

[54] HIGH-IMPACT MOLDING COMPOUNDS BASED ON POLYISOBUTYLENE-CONTAINING POLYCARBONATE

[75] Inventors: Burkhard Köhler, Krefeld; Werner Tischer, Dormagen; Wolfgang Ebert, Krefeld; Richard Weider, Leverkusen; Thomas Scholl, Bergisch Gladbach; Rolf Dhein, Krefeld, all of Germany

[73] Assignee: Bayer AG, Leverkusen, Germany

[21] Appl. No.: 740,028

[22] Filed: Oct. 23, 1996

Related U.S. Application Data

[63] Continuation of Ser. No. 500,427, Jul. 10, 1995, abandoned.

[30] Foreign Application Priority Data

Jul. 20, 1994 [DE] Germany ............... 44 25 620.5

[51] Int. Cl.$^6$ .................................................. C08L 69/00
[52] U.S. Cl. ..................... 525/67; 525/90; 525/92 E; 525/146
[58] Field of Search ................. 525/67, 90, 92 E, 525/146

[56] References Cited

U.S. PATENT DOCUMENTS 4,384,076  5/1983  Ohara ............................ 525/67
4,481,330  11/1984  Ohara ............................ 525/67
4,798,873  1/1989  Meurer et al. ................ 525/333.7
5,023,299  6/1991  Meuer ............................ 525/146

FOREIGN PATENT DOCUMENTS 0 248 261  12/1987  European Pat. Off. .
0 305 718  3/1989  European Pat. Off. .
0 345 652  12/1989  European Pat. Off. .
1 170 141  3/1962  Germany .
292360  12/1991  Japan ............................ 525/90

OTHER PUBLICATIONS

Liao "New Telechelic Polymers" *Polymer Bulletin* 7 pp. 233–240 (1982).
Martuscelli *Polymer Blends* pp. 2–8 (1980).
Chemical Abstract 81:14134f.
Orbit Absract of EP 0 248 261 (Dec. 9, 1987).
Orbit Abstract of EP 0 345 652 (Dec. 13, 1989).
Database WPI, Week 8604, Derwent Publications Ltd., London GB; AN 86–026269, XP002002118 & JP A 60 250 060 (Teijin Chemicals KK), Dec. 10, 1985.

*Primary Examiner*—David Buttner
*Attorney, Agent, or Firm*—Connolly & Hutz

[57] ABSTRACT

The invention relates to thermoplastic molding compounds containing polyisobutylene-modified polycarbonate, graft polymer and optionally copolymer, aromatic polycarbonate, polyolefins.

13 Claims, No Drawings

HIGH-IMPACT MOLDING COMPOUNDS BASED ON POLYISOBUTYLENE-CONTAINING POLYCARBONATE

This application is a continuation of application Ser. No. 08/500,427 filed on Jul. 10, 1995, and now abandoned.

This invention relates to high-impact molding compounds based on polyisobutylene (PIB)-modified polycarbonate and optionally other polymers.

Compounds of polycarbonate and graft polymers are generally known (for example DE-A 1 170 141). Although the toughness of these compounds is satisfactory, it is not good enough for certain applications.

In addition, polyisobutylene-modified polycarbonates are known (for example EP-A 305 718, DE-OS 3 618 378 (=U.S. Pat. No. 4,798,873)).

The problem addressed by the present invention was to provide molding compounds based on polycarbonate and graft polymers and optionally other polymers having an improved property profile, more particularly toughness.

It has now been found that compounds containing a polyisobutylene-modified polycarbonate show particularly high toughness.

The present invention relates to thermoplastic molding compounds containing

A) 5 to 90 and preferably 10 to 80 parts by weight of polyisobutylene-modified aromatic polycarbonate, the percentage by weight of polyisobutylene telechels in the polymer as a whole being from 1 to 40 and preferably from 2.5 to 33% by weight, B) 10 to 95 and preferably 20 to 90 parts by weight of a graft polymer of a mixture of B.1.1 50 to 95 and preferably 60 to 90 parts by weight of styrene, α-methyl styrene, halogen- or methyl-nucleus-substituted styrene, $C_{1-8}$ alkyl methacrylate, more particularly methyl methacrylate, $C_{1-8}$ alkyl acrylate, more particularly methacrylate, or mixtures of these compounds and B.1.2 5 to 50 and preferably 10 to 40 parts by weight of acrylonitrile, methacrylonitrile, $C_{1-8}$ alkyl methacrylates, more particularly methyl methacrylate, $C_{1-8}$, alkyl acrylate, more particularly methacrylate, maleic anhydride, $C_{1-4}$-alkyl- or phenyl-N-substituted maleic imides or mixtures of these compounds on B.2 5 to 95 and preferably 20 to 70 parts by weight of polymer based on diene and/or alkyl acrylate with a glass transition temperature below $-10°$ C., C) 0 to 20 parts by weight of a rubber different from B), D) 0 to 70 parts by weight of a copolymer of D.1 50 to 98 and preferably 60 to 95 parts by weight of styrene, a-methyl styrene, nucleus-substituted styrenes, $C_{1-8}$ alkyl methacrylates, $C_{1-8}$ alkyl acrylates or mixtures thereof and D.2 50 to 2 and preferably 40 to 5 parts by weight of acrylonitrile, methacrylonitrile, $C_{1-8}$ alkyl methacrylates, $C_{1-8}$ alkyl acrylates, maleic anhydride, N-substituted maleic imides and mixtures thereof, E) 0 to 80 parts by weight of aromatic polycarbonate, F) 0 to 40 parts by weight of polyolefins, the sum of components A+B+C+D+E+F being 100.

Component A

The polyisobutylene-modified polycarbonates are known from the literature (for example EP-A 305 718, DE-OS 3 618 378 and US-P 4,798,873) or may be obtained by methods known from the literature.

The polycarbonates in question are polycarbonate/polyisobutylene block co-condensates of polyisobutylene blocks functionalized by terminal groups, so-called polyisobutylene telechels (cf. Römpp, Chemie Lexikon, 9th Edition, Vol. 6, 1992, page 4485), and polycarboxylate structural units, the polyisobutylene units making up 1 to 40, preferably 2.5 to 33 and more preferably 6 to 33% by weight of the polymer as a whole.

In the context of the invention, polyisobutylene telechels are preferably functionalized polyisobutylene telechels containing essentially one carboxylic acid and one keto group, essentially two amino groups, primary or secondary alkylamino, essentially two hydroxy groups or essentially two aspartic acid ester groups.

The PIP/PC block co-condensates have average molecular weights (weight average as determined, for example, by gel chromatography) of 8,000 to 200,000.

The polyisobutylene telechels have weight average molecular weights $M$, (as determined, for example, by gel permeation chromatography) of 250 to 500,000 and preferably in the range from 1,000 to 10,000.

Educts for the amino- or hydroxy-terminated polyisobutylene telechels obtainable by ozonolysis and subsequent derivatization are copolymers of isobutylene and 0.5 to 15 mole-% of dienes, such as for example butadiene, 2-chloro-1,4-butadiene, 2-bromo-1,4-butadiene, pentadiene, hexadiene, 2-ethyl-1,3-butadiene, 2-propyl-1,3-butadiene, 2-phenyl-1,3-butadiene, 2,3-dimethyl-1,3-butadiene, 2-methyl-1,3-pentadiene or 3-propoxy-1,3-hexadiene. Copolymers such as these are commercially available under the name of butyl rubber. Isoprene is particularly preferred as the diene monomer. The dienes are essentially bonded in the 1,4-position. Low levels of 1,2-bond, which is present in all commercially obtainable butyl rubbers and which cannot be completely suppressed, lead to equally low numbers of lateral functional groups and hence to polymers containing more than two functional groups per polymer chain.

The polyisobutylene telechels contain approximately 1.8 to 2.5 and preferably 1.8 to 2.2 functional groups per polymer chain.

Polyisobutylene telechels (carboxyl-terminated) may be obtained in accordance with DE-OS 2 147 874, for example, by ozonolysis of polyisobutylene with a small content of isoprene as comonomer.

Polyisobutylene telechels essentially containing two secondary amino groups may be obtained in accordance with DE-OS 4 122 655, for example, by ozonolysis of polyisobutylene with a small content of isoprene as comonomer and subsequent aminating hydrogenation in the presence of primary amines.

Polyisobutylene telechels essentially containing two hydroxy groups may be obtained in accordance with DE-OS 4 122 655 by ozonolysis of polyisobutylene with a small content of isoprene as comonomer and subsequent hydrogenation.

Polyisobutylene telechels essentially containing two aspartic acid ester groups can be obtained by reaction of a polyisobutylene telechel essentially containing two amino groups, prepared in accordance with DE-OS 4 122 655 by ozonolysis of polyisobutylene with a small content of isoprene as comonomer and subsequent aminating hydrogenation in the presence of ammonia, with maleic acid esters of fumaric acid esters under the conditions of a Michael addition.

Preferred aromatic polycarbonates are those based on diphenols corresponding to formula (I) and/or (II):

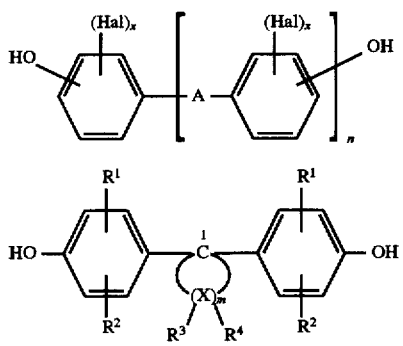

(I)

(II)

in which

A is a single bond, a $C_{1-5}$ alkylene, a $C_{2-5}$ alkylidene, a $C_{5-6}$ cycloalkylidene, —S— or —SO$_2$—, Hal is chlorine or bromine, x=0, 1 or 2 and n=1 or 0, $R^1$ and $R^2$ independently of one another represent hydrogen, halogen, preferably chlorine or bromine, $C_{1-8}$ alkyl, preferably methyl or ethyl, $C_{5-6}$ cycloalkyl, $C_{6-10}$ aryl, preferably phenyl, and $C_{7-12}$ aralkyl, preferably phenyl-$C_{1-4}$-alkyl, more particularly benzyl, m is an integer of 4 to 7, preferably 4 or 5, $R^3$ and $R^4$ may be individually selected for each X and, inpendently of one another, represent hydrogen or $C_{1-6}$ alkyl, preferably hydrogen, methyl or ethyl, and X is a hydrocarbon, with the proviso that, at at least one atom X, $R^3$ and $R^4$ are both alkyl.

Suitable diphenols corresponding to formula (I) are, for example, hydroquinone, resorcinol, 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-cyclohexane, 2,2-bis-(3-chloro-4-hydroxyphenyl)-propane, 2,2-bis-(dibromo-4-hydroxyphenyl)-propane.

Preferred diphenols corresponding to formula (I) are 2,2-bis-(4-hydroxyphenyl)-propane, 2,2-bis-(3,5-dichloro-4-hydroxyphenyl)-propane and 1,1-bis-(4-hydroxyphenyl)-cyclohexane.

Preferred diphenols corresponding to formula (II) are dihydroxydiphenyl cycloalkanes containing 5 and 6 ring C atoms in the cycloaliphatic part (m=4 or 5 in formula (II)), such as for example diphenols corresponding to the following formulae:

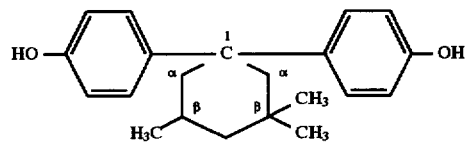
(IIa)

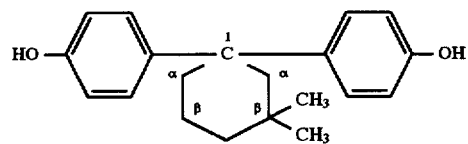
(IIb)

and

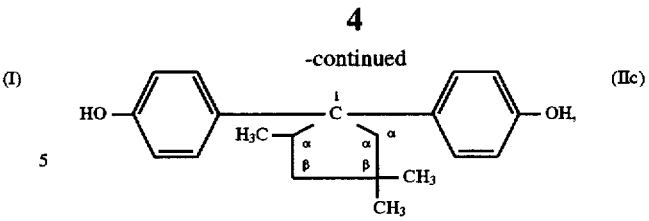
(IIc)

The polycarbonates may be both homopolycarbonates and copolycarbonates and mixtures thereof.

The production of the polycarbonates suitable in accordance with the invention for component A is known from the literature and may be carried out, for example, with phosgene by the interfacial process or with phosgene by the homogeneous-phase process, the so-called pyridine process, the particular molecular weight to be established being obtained in known manner through a corresponding quantity of known chain terminators.

The quantity of chain terminators to be used is generally between 0.5 and 10 mole-%, based on the sum of the diphenols used.

The polycarbonates suitable in accordance with the invention for component A have weight average molecular weights ($\overline{M}_w$ as measured, for example, by ultracentrifugation or scattered light measurement) in the range from 10,000 to 200,000 and preferably in the range from 20,000 to 80,000.

The relative solution viscosities, as measured in methylene chloride as solvent at 25° C. and at a concentration of 0.5 g/100 ml, of the polycarbonates suitable for use in accordance with the invention is typically in the range from 1.18 to 1.34.

The PIB-modified polycarbonates are produced, for example, by adding 1 to 40% by weight, based on the polymer as a whole, of carboxy-terminated polyisobutylene telechels in the production of the polycarbonates or by treating polycarbonates with polyisobutylene telechels in solution (chlorobenzene, for example, as solvent) at temperatures of generally 120° to 200° C. or in the melt at temperatures of generally 220° to 340° C. or by concentrating a solution (chlorobenzene or methylene chloride, for example, as solvent) of polycarbonates and polyisobutylene telechels by evaporation in evaporation extruders. Production in the melt may also take place in situ during the mixing of components A to F by adding a mixture of polycarbonate and PIB telechel to the mixture instead of component A.

Component B

Preferred graft bases are polybutadienes, butadiene/styrene copolymers and acrylate rubbers. The graft base is particulate and generally has an average particle diameter ($d_{50}$) of 0.05 to 5 µm and preferably 0.1 to 0.8 µm.

In addition to butadiene, the graft base may contain up to 50% by weight of residues of other ethylenically unsaturated monomers, such as styrene, acrylonitrile, esters of acrylic or methacrylic acid containing 1 to 4 carbon atoms in the alcohol component (such as methyl acrylate, ethyl acrylate, methyl methacrylate, ethyl methacrylate), vinyl esters and/or vinyl ethers. The preferred graft base consists of pure polybutadiene.

Preferred graft polymers B are, for example, bases B.2 grafted with styrene and/or acrylonitrile and/or alkyl (meth) acrylates, such as polybutadienes, butadiene/styrene copolymers and acrylate rubbers, i.e. copolymers of the type described in DE-OS 1 694 173 (=U.S. Pat. No. 3,564,077), polybutadienes grafted with alkyl acrylates or methacrylates, vinyl acetate, acrylonitrile, styrene and/or alkyl styrenes, butadiene/styrene or butadiene/acrylonitrile copolymers, polyisobutenes or polyisoprenes of the type described, for example, in DE-OS 2 348 377 (=U.S. Pat. No. 3,919,353).

Since the graft monomers are not necessarily grafted completely onto the graft base in the grafting reaction, graft polymers C in the context of the invention also include products obtained by polymerization of the graft monomers in the presence of the graft base.

The average particle size $d_{50}$ is the diameter above which 50% by weight of the particles and below which 50% by weight of the particles lie. It may be determined by ultracentrifuge measurement (W. Scholtan, H. Lange, Kolloid Z. und Z. Polymere 250 (1972), 782–796).

The acrylate rubbers (graft base B.2) are preferably polymers of alkyl acrylates, optionally with up to 40% by weight of other polymerizable ethylenically unsaturated monomers. Preferred polymerizable acrylates include $C_{1-8}$ alkyl acrylates, for example methyl, ethyl, butyl, n-octyl and 2-ethyl hexyl acrylate; haloalkyl acrylates, preferably halo-$C_{1-8}$-alkyl acrylates, such as chloroethyl acrylate, and mixtures of these monomers.

For crosslinking, monomers containing more than one polymerizable double bond may be copolymerized. Preferred examples of crosslinking monomers are esters of unsaturated monocarboxylic acids containing 3 to 8 carbon atoms and unsaturated monohydric alcohols containing 3 to 12 carbon atoms or saturated polyols containing 2 to 4 OH groups and 2 to 20 carbon atoms, such as for example ethylene glycol dimethacrylate, allyl methacrylate; polyunsaturated heterocyclic compounds, such as for example trivinyl and triallyl cyanurate; polyfunctional vinyl compounds, such as divinyl and trivinyl benzenes; and also triallyl phosphate and diallyl phthalate.

The quantity of crosslinked monomers is preferably 0.02 to 5% by weight and more preferably 0.05 to 2% by weight, based on the graft base.

Component C

The rubbers used for component C are, optionally, preferably ethylene/vinyl acetate copolymers, polyisobutylene rubbers, epoxyfunctional ethylene/acrylate terpolymers, more preferably polyisobutylene rubbers.

The ethylene/vinyl acetate c,opolymers have vinyl acetate contents of 20 to 80% by weight. The epoxyfunctional ethylene/acrylate copolymers have an ethylene content of 60 to 90% by weight, an acrylate content of 8 to 38% by weight and a percentage content of epoxyfunctional monomer, preferably polyacryl methacrylate, of 2 to 15% by weight. 85 to 100% by weight of the polyisobutylene rubbers consist of cationically polymerized isobutene to which 0 to 15% by weight of comonomers, such as for example dienes, m-p-methyl styrene, styrene, α-methyl styrene or divinyl benzene, may be added. The molecular weight (weight average) $\overline{M}_w$ is in the range from 200,000 to 2,000,000.

Component D

The thermoplastic polymer D includes homopolymers or copolymers of one or more ethylenically unsaturated monomers (vinyl monomers), such as for example styrene, α-methyl styrene, nucleus-substituted styrenes, acrylonitrile, methacrylonitrile, methyl methacrylate, maleic anhydride, N-substituted maleic imides and (meth)acrylates containing 1 to 18 carbon atoms in the alcohol component.

The copolymers of component D are resin-like, thermoplastic and rubber-free.

Preferred vinyl copolymers D are those of at least one monomer from the series comprising styrene, α-methyl styrene and/or nucleus-substituted styrene (D.1) with at least one monomer from the series comprising acrylonitrile, methacrylonitrile, methyl methacrylate, maleic anhydride and/or N-substituted maleic imide (D.2).

Particularly preferred copolymers D are those of styrene with acrylonitrile and optionally with methyl methacrylate, of a-methyl styrene with acrylonitrile and optionally with methyl methacrylate or of styrene and α-methyl styrene with acrylonitrile and optionally with methyl methacrylate.

The styrene/acrylonitrile copolymers of component D are known and may be obtained by radical polymerization, more particularly by emulsion, suspension, solution or bulk polymerization. The copolymers of component D preferably have molecular weights $\overline{M}_w$ (weight average, as determined by light scattering or sedimentation) in the range from 15,000 to 200,000.

If the mixture contains copolymers suitable for component C, 5 to 20% by weight (based on 100 parts of A+B+C+D+E+F) are preferably added.

Component E

The aromatic polycarbonates which may be added to the mixture correspond to the polycarbonates described in reference to component A). Molding compounds containing components A), B), E) and optionally D) are also preferred. These thermoplastic molding compounds preferably have the following composition:

A) 10 to 30 parts by weight of polyisobutylene-modified polycarbonate

B) 10 to 40 and preferably 10 to 30 parts by weight of graft polymer of a mixture of B.1.1 and B.1.2 on B.2

E) 20 to 70 parts by weight of polycarbonate and optionally

D) 5 to 25 parts by weight of copolymer of D.1 and D.2.

Component F

Polyolefins suitable for the purposes of the invention are polymers of aliphatic unsaturated hydrocarbons, such as for example ethylene, propylene or butylene, which may be obtained by known methods, for example radical polymerization, and which have weight average molecular weights $\overline{M}_w$ (as measured by gel chromatography) in the range from 5,000 to 3,000,000. Both high-pressure and low-pressure polyolefin may be used. The unsaturated hydrocarbons may even be copolymerized in known manner with other vinyl monomers, such as for example vinyl acetate, acrylic acid or acrylates, the other vinyl monomers making at most 30% by weight and preferably 25% by weight of the copolymer.

If polyolefins are added to the mixture, they are preferably added in a quantity of 3 to 15% by weight, based on 100 of A+B+C+D+E+F.

Components A), B), C), D), E) and F) are melt-compounded in kneaders or extruders at elevated temperatures and generally at temperatures of 230° to 330° C.

The additives typically used for polycarbonates and butyl rubbers, for example stabilizers, mold release agents, antiagers, flameproofing agents, pigments, dyes, etc., may be added to the molding compounds according to the invention. These additives may be added in typical quantities during the molding of the compounds to form moldings of any kind.

The molding compounds according to the invention may be used for the production of moldings of any kind, for example by injection molding. Examples of moldings are housings of domestic appliances and electrical equipment.

Accordingly, the present invention also relates to the use of the molding compounds for the production of moldings.

The individual components of the compound may consist completely or partly of recyclates or production waste.

EXAMPLES

Component A
Component A.1 a) Production of a carboxyl-terminated polyisobutylene telechel 1 kg of isobutylene/isoprene rubber with an isoprene content of 2.1 mole-% and a Mooney viscosity of 47 (ML8, 100° C.) (Polysar Butyl 402, a product of Bayer AG) is size-reduced to large pieces (approx. 2 cm in diameter) and suspended in 4 l of hexane. A stream of ozone-enriched oxygen (300 l/h, ozone component approx. 10 g/h) is introduced into the mixture with stirring at 15 to 25° C. until an acid value of 17 is reached. This takes 6 hours. Based on the isoprene content of the butyl rubber, the quantity of ozone introduced amounts to approx. 3 moles per mole of isoprene. The solid components dissolve completely during introduction of the oxygen. After purging with nitrogen, the mixture is stirred briefly with 5 g of active carbon and filtered, after which the solvent is distilled off. The IR spectrum of the colorless oil remaining behind shows a strong band at 1720 $cm^{-1}$. After neutralization, the absorptions for the keto group (1720 $cm^{-1}$) and the carboxylate groups (1560 $cm^{-1}$) can be differentiated. The sample freed from the solvent in vacuo has a molecular weight Mn of 3600 (GPC analysis). The carboxyl functionality calculated with the acid value determined (17 mg KOH/g) is 1.09 moles COOH per mole of polymer.

b) Production of the polyisobutylene-modified polycarbonate

A mixture of 5870 g of 45% NaOH, 35 l of water, 3238 g of bisphenol A, 74 g of isooctyl phenol, 400 g of the acid-terminated PIB telechel mentioned in a), 11 kg of chlorobenzene and 25 l of methylene chloride is phosgenated with 2200 g of phosgene. The subsequent polycondensation is catalyzed with 20 ml of N-ethyl piperidine. The reaction solution is concentrated by evaporation in an evaporation extruder (ZSK 32).

A PC/PIB block co-condensate containing 10% by weight of polyisobutylene and having a relative solution viscosity $\eta_{rel}$ of 1.28 (0.5% in methylene chloride at 25° C.) is obtained.

Component A2 a) 400 g of isobutylene/isoprene rubber with an isoprene content of 1.6 mole-% and a Mooney viscosity of 51 (ML 1+8, 125° C.) (Polysar Butyl 301, a product of Bayer AG) are dissolved in 1.5 l of petroleum ether. A stream of ozone-enriched oxygen (50 l/h, ozone component approx. 4 g/h) is introduced into the solution with stirring at 0° to 10° C. until the calculated quantity of ozone (2.75 g) has been taken up. After purging with nitrogen, a solution of 5 g of sodium borohydride in 20 ml of 50% ethanol is added with vigorous stirring, followed by stirring until no more peroxide can be detected with iodine/starch paper. The aqueous phase is separated off, the organic phase is dried over sodium sulfate and the solvent is distilled off. The IR spectrum of the oil remaining behind shows a strong band at 1720 $cm^{-1}$.

This oil is dissolved in 500 ml of tetrahydrofuran and the resulting solution is hydrogenated in the presence of 20 g of Raney nickel and 200 g of methylamine at 150° C./150 bar hydrogen pressure until the IR band at 1720 $cm^{-1}$ has disappeared. After filtration, the solvent is distilled off. The $NHCH_3$-terminated polymer has an amine value of 29 (methylamino-terminated PIB telechel).

b) Production of the polyisobutylene-modified polycarbonate 1.8 kg of polycarbonate ($\eta_{rel}$=1.28) are dissolved in 4 l of chlorobenzene and 8 l of methylene chloride and 200 g of the methylamino-terminated PIB telechel mentioned in a) are dissolved in 1 l of chlorobenzene, the two solutions are mixed and then concentrated by evaporation in an evaporation extruder (ZSK 32) (final temperature 300° C.).

Component B

Graft polymer of 45 parts by weight of a copolymer of styrene and acrylonitrile (72:28) on 55 parts by weight of particulate crosslinked polybutadiene rubber (average particle diameter $d_{50}$=0.4 μm), produced by emulsion polymerization.

Component D

Styrene/acrylonitrile copolymer with a ratio of styrene to acrylonitrile of 72:28 and an intrinsic viscosity of 0.55 dl/g (as measured in dimethyl formamide at 20° C.).

Component E

Linear polycarbonate based on bisphenol A with a relative solution viscosity of 1.2547, as measured in $CH_2Cl_2$ as solvent at 25° C. and in a concentration of 0.5 g/100 ml.

Component F

Low-density polyethylene (LDPE), Lupolen 1810 E@, a product of BASF.

Production and testing of the blends

The blends were produced in the melt in a discontinuous kneader. The compounds according to the invention and the comparison compounds were tested for notched impact strength (ak) in accordance with DIN 53 543. The injection temperature of the test specimens was 240°, 260° and 280° C.

TABLE 1

| | Composition of the molding compounds (in % by weight) | | | | | |
|---|---|---|---|---|---|---|
| | Components | | | | | |
| Example | A1 | A2 | B | D | E | F |
| 1 | 24 | — | 20 | 16 | 40 | |
| 2 (Comparison) | — | — | 24 | 16 | 60 | |
| 3 | 16.5 | — | 30 | 40 | — | 13.5 |
| 4 (Comparison) | — | — | 30 | 40 | 15 | 15 |
| 5 | — | 24 | 20 | 16 | 40 | |
| 6 | — | 24* | 20 | 16 | 40 | |

*Component A2 is not added as such, instead 21.6% by weight of polycarbonate (relative viscosity 1.28) and 2.4% by weight of methylamino-terminated PIB telechel are mixed with the other components, component A2 being formed in situ.

TABLE 2

| | Results | | | |
|---|---|---|---|---|
| Example | $a_k$ 240° C. [kJ/m$^2$] | $a_k$ 260° C. [kJ/m$^2$] | $a_k$ 280° C. [kJ/m$^2$] | Vicat B [°C.] |
| 1 | — | 69.0 | 64 | 122 |
| 2 (Comparison) | — | 55 | 47 | 121 |
| 3 | 18.3 | — | — | — |
| 4 (Comparison) | 7 | — | — | — |
| 5 | — | 67 | 64 | 121 |
| 6 | — | 68 | 83 | 122 |

Comparison of Example 1 with Comparison Example 2 shows that the blend according to Example 1 has a higher toughness. It also shows higher heat resistance because the percentage decrease in toughness at the relatively high processing temperature (280° C.) is lower (better processing stability). The compounds of Examples 5 and 6 behave similarly to Example 1.

The toughness of Example 3 is distinctly increased in relation to Comparison Example 4.

We claim:

1. Thermoplastic molding compounds consisting essentially of:
   A) 10 to 30 parts by weight of polyisobutylene-modified aromatic polycarbonate, the percentage by weight of polyisobutylene telechels in the polymer as a whole being from 1 to 40% by weight, said polyisobutylene telechels being obtained by ozonolysis and having 1.8 to 2.5 functional groups per polymer chain,
   B) 10 to 40 parts by weight of a graft polymer of a mixture of
      B.1.1 50 to 95 parts by weight of styrene, a-methyl styrene, halogen- or methyl-nucleus-substituted styrene, or mixtures of these compounds and
      B.1.2 5 to 50 parts by weight of acrylonitrile, methacrylonitrile, $C_{1-8}$ alkyl methacrylates, $C_{1-8}$ alkyl acrylate, maleic anhydride, $C_{1-4}$-alkyl- or phenyl-N-substituted maleic imides or mixtures of these compounds on
      B.2 5 to 95 parts by weight of polymer based on diene and/or alkyl acrylate with a glass transition temperature below $-10°$ C.,
   D) 5 to 25 parts by weight of a copolymer of
      D.1 50 to 98 parts by weight of styrene, α-methyl styrene, nucleus-substituted styrenes, or mixtures thereof and
      D.2 50 to 2 parts by weight of acrylonitrile, methacrylonitrile, $C_{1-8}$ alkyl methacrylates, $C_{1-8}$ alkyl acrylates, maleic anhydride, N-substituted maleic imides or mixtures thereof, and
   E) 20 to 70 parts by weight of aromatic polycarbonate, the sum of components A+B+D+E being 100.

2. Thermoplastic molding compounds as claimed in claim 1, the polyisobutylene being selected from functionalized polyisobutylene telechels containing essentially one carboxylic acid and one keto group, essentially two amino groups, primary or secondary alkylamino, essentially two hydroxy groups or essentially two aspartic acid ester groups.

3. thermoplastic molding compounds claimed in claim 1 containing additives selected from the group consisting of stabilizers, mold release agents, antiagers, flame-proofing agents, pigments and dyes.

4. A method of using the thermoplastic molding compounds claimed in claim 1, wherein the compounds are formed into moldings.

5. Molding comprising the thermoplastic molding compounds claimed in claim 1.

6. Thermoplastic molding compounds according to claim 1, wherein component B.2 is selected from the group consisting of polybutadiene, butadiene/styrene copolymers and acrylate rubbers.

7. Thermoplastic molding compounds according to claim 1, wherein said polyisobutylene telechels are obtained by ozonolysis of polyisobutylene with a small content of isoprene as a comonomer.

8. Thermoplastic molding compounds consisting of:
   A) 10 to 30 parts by weight of polyisobutylene-modified aromatic polycarbonate, the percentage by weight of polyisobutylene telechels in the polymer as a whole being from 1 to 40% by ozonolysis and the polyisobutylene telechels having 1.8 to 2.5 functional groups per polymer chain, 10 to 40 parts by weight of a graft polymer of a mixture of
      B1.1 50 to 95 parts by weiaht of styrene α-miethyl styrene, halogen- or methyl-nucleus-substituted styrene, or mixtures of these compounds and
      B.1.2 5 to 50 parts by weight of acrylonitrile, methacrylonitrile, $C_{1-8}$ alkyl methacrylates, $C_{1-8}$ alkyl acrylate, maleic anhydride $C_{1-4}$-alkyl- or phenyl-N-substituted maleic imides or mixtures of these compounds on
   B.2 5 to 95 parts by weight of polymer based on diene and/or alkyl acryl ate with a ctlass transition temperature below $-10°$ C. and
   E) 20 to 70 parts by weight of aromatic polycarbonate, the sum of component: A+B+E being 100.

9. Thermoplastic molding compounds consisting of:
   A) 5 to 90 parts by weight of polyisobutylene-modified aromatic polycarbonate, the percentage by weight of polyisobutylene telechels in the polymer as a whole being from 1 to 40% by weight said polyisobutylene telechels being obtained by ozonolysis and having 1.8 to 2.5 functional groups per polymer chain,
   B) 10 to 40 parts by weight of a graft polymer of a mixture of
      B. 1.1 50 to 95 parts by weight of styrene, α-methyl styrene, halogen- or methyl-nucleus-substituted styrene, $C_{1-8}$ alkyl methacrylate, $C_{1-8}$ alkyl acrylate, or mixtures of these compounds and
      B.1.2 5 to 50 parts by weight of acrylonitrile, methacrylonitrile, maleic anhydride, $C_{1-4}$-alkyl- or phenyl-N-substituted maleic imides or mixtures of these compounds on
      B.2 5 to 95 parts by weight of polymer based on diene and/or alkyl acrylate with a glass transition temperature below $-10°$ C.,
   D) 5 to 25 parts by weight of a copolymer of D.1 50 to 98 parts by weight of styrene, α-methyl styrene, nucleus-substituted styrenes or mixtures thereof and
   D.2 50 to 2 parts by weight of acrlonitrile, methacryonitrile $C_{1-8}$ alkyl methacrlates, $C_{1-8}$ alkyl acrelates, maleic anhydride, N-substituted maleic imides or mixtures thereof, and
   E) 20 to 70 parts by weight of aromatic polycarbonate, the sum of components A+B+D+E being 100.

10. Thermoplastic molding compounds according to claim 9, wherein component B.2 is selected from the group consisting of polybutadiene, butadiene/styrene copolymers and acrylate rubbers.

11. Thermoplastic molding compounds according to claim 9, wherein said polyisobutylene telechels are obtained by ozonolysis of polyisobutylene with a small content of isoprene as a comonomer.

12. Thermoplastic molding compounds consisting of:
    A) 10 to 30 parts by weight of polyisobutylene-modified aromatic polycarbonate, the percentage by weight of polyisobutylene telechels in the polymer as a whole being from 1 to 40% by weight, said polyisobutylene telechels being obtained by ozonolysis and having 1.8 to 2.5 functional groups per polymer chain,
    B) 10 to 40 parts by weight of a graft polymer of a mixture of
       B. 1.1 50 to 95 parts by weight of styrene, α-methyl styrene, halogen- or methyl-nucleus-substituted styrene, or mixtures of these compounds and
       B.1.2 5 to 50 parts by weight of acrylonitrile, methacrylonitrile, $C_{1-8}$ alkyl methacrylates, $C_{1-8}$ alkyl acrylate, maleic anhydride, $C_{1-4}$-alkyl- or phenyl-N-substituted maleic imides or mixtures of these compounds on
       B.2 5 to 95 parts by weight of polymer based on diene and/or alkyl acrylate with a glass transition temperature below $-10°$ C., D) 5 to 25 parts by weight of a copolymer of D.1 50 to 98 parts by weight of styrene, α-methyl styrene, nucleus-substituted styrenes, $C_{1-8}$ alkyl methacrylates, $C_{1-8}$ alkyl acrylates and mixtures thereof, and D.2 50 to 2 parts by weight of acrylonitrile, methacrylonitrile, maleic anhydride, N-substituted maleic imides or mixtures thereof, and E) 20 to 70 parts by weight of aromatic polycarbonate, the sum of components A+B+D+E being 100.

13. Thermoplastic molding compounds according to claim 12, wherein said polyisobutylene telechels are obtained by ozonolysis of polyisobutylene with a small content of isoprene as a comonomer.

* * * * *

UNITED STATES PATENT AND TRADEMARK OFFICE
CERTIFICATE OF CORRECTION

PATENT NO. : 5,747,586
DATED : May 5, 1998
INVENTOR(S) : KÖHLER ET AL.

It is certified that error appears in the above-identified patent and that said Letters Patent is hereby corrected as shown below:

Column 9, line 40 (Claim 3), "thermoplastic" should be --Thermoplastic--.

Column 9, line 47 (Claim 5), "Molding" should be --Moldings--.

Column 9, line 60 (Claim 8), "polvisobutylene" should be --polyisobutylene- --.

Column 9, line 61 (Claim 8), the following should be inserted after "1 to 40%": --by weight, said polyisobutylene telechels being obtained--.

Column 9, line 63, after "polymer chain," insert a line break and then --B)--.

Column 9, line 65, "weiaht" should be --weight-- and "α-miethyl" should be --α-methyl--.

Column 10, line 3, a "," should be inserted after "maleic anhydride".

Column 10, line 7, "acryl ate" should be --acrylate-- and "ctlass" should be --glass- --.

Column 10, line 15, a "," should be inserted after "weight".

Column 10, line 30, "D.1  50 to 98" should be moved to the next line.

Column 10, lines 33 and 34, "acrlonitrile" should be --acrylonitrile--; "methacryonitrile" should be --methacrylonitrile--; "alkyl methacrlates" should be --alkyl methacrylates-- and "acrelates" should be --acrylates--.

Signed and Sealed this

Tenth Day of April, 2001

NICHOLAS P. GODICI

*Attest:*

*Attesting Officer*     Acting Director of the United States Patent and Trademark Office